Dec. 26, 1961  J. S. NEWTON  3,014,706
ROTARY BORING MACHINE HAVING RECIPROCATING CUTTER BAR
Filed Dec. 8, 1959  2 Sheets-Sheet 2
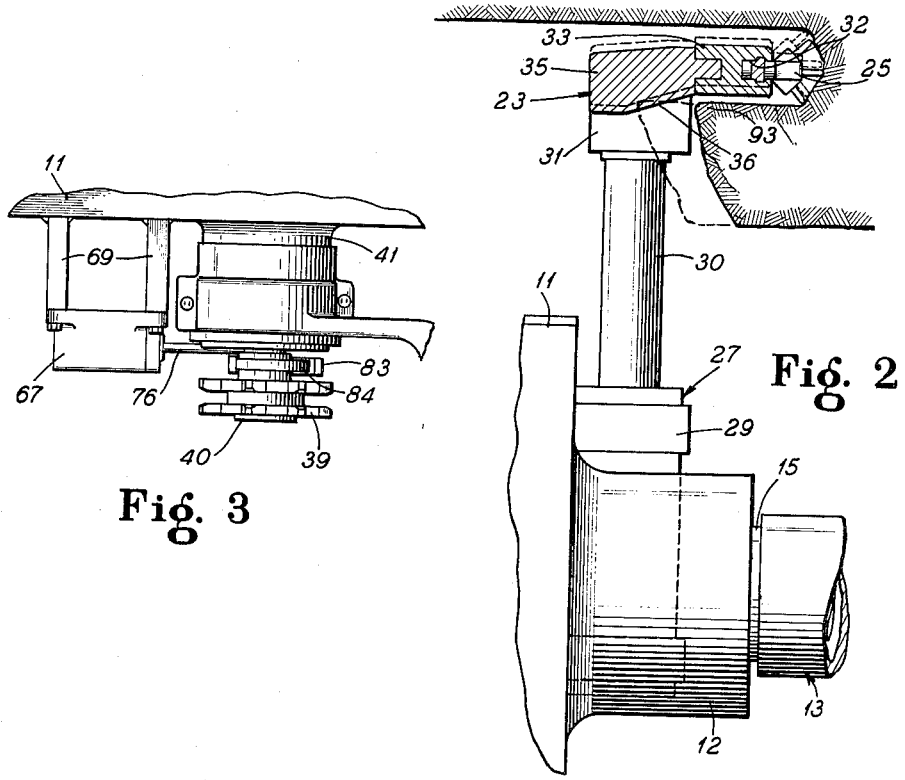
Fig. 2
Fig. 3
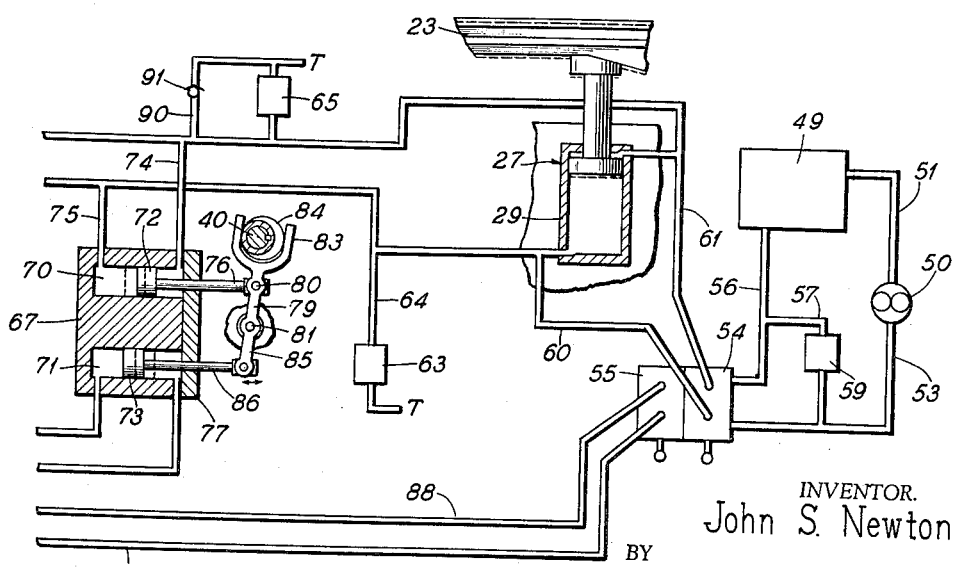
Fig. 4
INVENTOR.
John S. Newton
BY United States Patent Office 3,014,706
Patented Dec. 26, 1961

3,014,706
ROTARY BORING MACHINE HAVING RECIPROCATING CUTTER BAR
John S. Newton, Glen Ellyn, Ill., assignor to Goodman Manufacturing Company, Chicago, Ill., a corporation of Illinois
Filed Dec. 8, 1959, Ser. No. 858,162
7 Claims. (Cl. 262—9)

This invention relates to improvements in continuous mining machines of the boring type.

A principal object of the invention is to provide a simplified and improved means for reducing the power requirements for breaking down the cusps left between the boring heads of a continuous mining machine by positively breaking the cusps prior to the advance of the machine a distance sufficient to wedge the cusps from the coal face.

A further object of the invention is to improve upon continuous mining machines of the boring type by providing means for reciprocably moving at least the upper trimmer bar, trimming the depending cusp left between the boring arms of the boring head, to break down the cusp left between the boring heads with a hammer-like action.

Still another object of the invention is to provide a simplified and improved means for breaking down the cusps left between the boring heads of a continuous boring machine by utilizing a vertically adjustable trimmer bar cutting a kerf in the cusp adjacent the mine room and by reciprocably moving the upper trimmer bar in a vertical direction through the support and adjusting means therefor, to effect a breaking action on the cusp prior to advance of the machine a distance sufficient to wedge the cusp down.

These and other objects of the invention will appear from time to time as the following specification proceeds and with reference to the accompanying drawings wherein:

FIGURE 2 is a fragmentary view in side elevation, showing the upper trimmer bar cutting a kerf along the mine roof, and the positions taken by the upper trimmer bar to effect a vertical breaking action on the cusp left between the boring arms;

FIGURE 3 is a fragmentary detail plan view showing the drive sprockets for the trimmer chain and the mechanism driven thereby for reciprocably moving the upper trimmer bar; and FIGURE 4 is a diagrammatic view illustrating the fluid diagram for effecting reciprocable movement of at least the upper trimmer bar.

Figure 1:
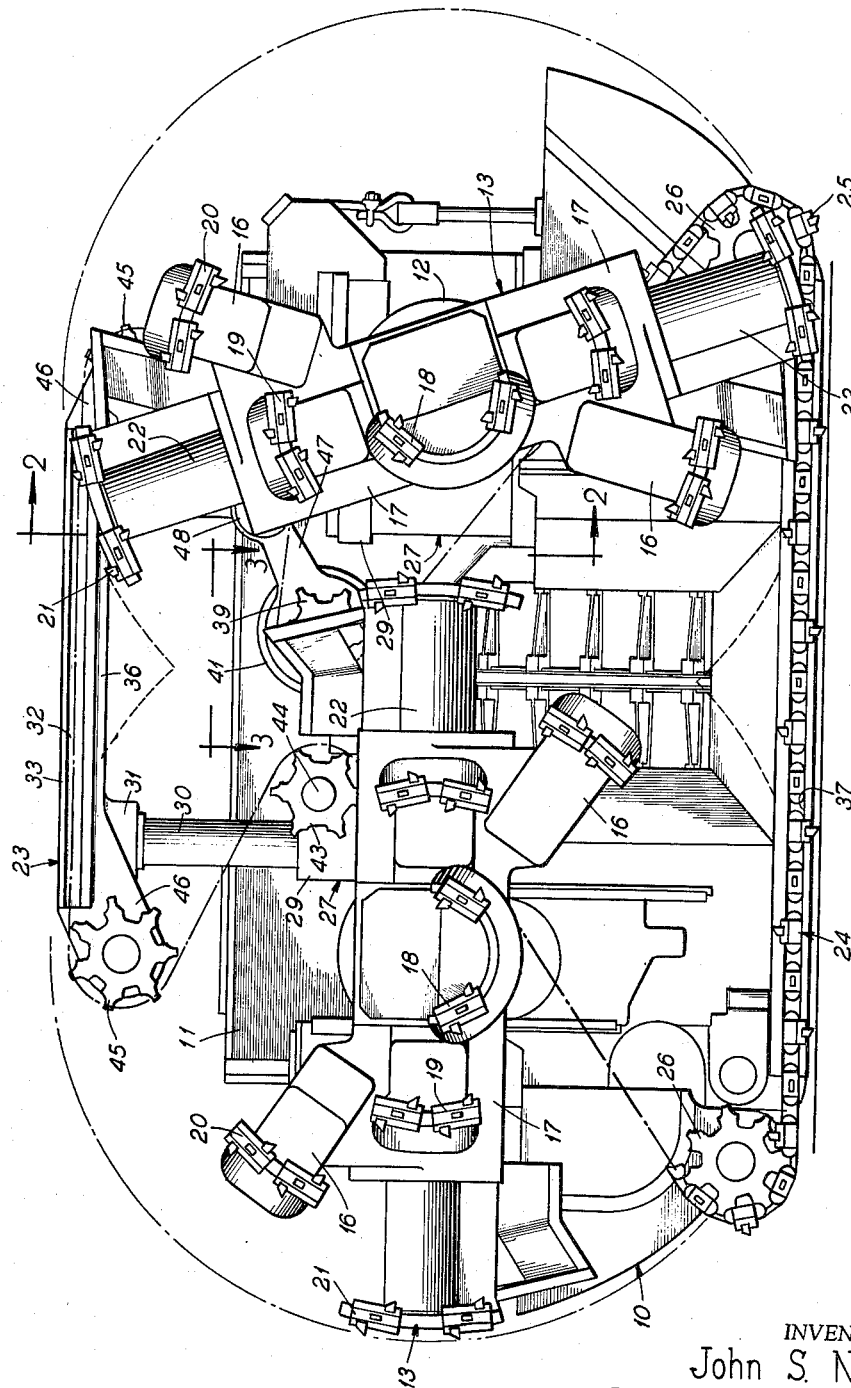
FIGURE 1 is a front end view of a continuous mining machine of the boring type having my invention embodied therein.

In the embodiment of the invention illustrated in the drawings, I have shown in FIGURE 1 a continuous mining machine 10 of the boring type having a cutter frame 11, mounted on and projecting forwardly from the main frame (not shown) of the machine, for vertical adjustment with respect thereto, in a conventional manner. The cutter frame 11 has spaced hubs 12 extending forwardly therefrom, forming supports for boring heads 13 mounted on shafts 15 supported on and journalled in said hubs. The boring heads 13 have radial arms 16 and 17 having a central arcuate cutter 18 projecting forwardly therefrom and radially outwardly spaced arcuate cutters 19, 20 and 21 mounted thereon, the outermost cutters 21 extending forwardly of telescopic arms 22, radially adjustable to adjust the boring head to the desired cutting height. The boring heads 13 are driven from the shaft 15 journalled within the hubs 12, and driven in opposite directions from a suitable motor and reduction gearing (not shown), to drive the boring heads to cut and break down the material in the working face and to progress the broken down material toward the center of the machine.

The cutter frame 11 also forms a support for an upper cutter or trimmer bar 23 and a lower trimmer bar 24. The trimmer bars 23 and 24 have a cutter chain 25 guided for movement thereabout for cutting along the roof to cut out the depending cusp left between the boring heads 13 and for cutting along the mine floor for cutting out the upwardly extending cusp left between said boring heads.

The lower trimmer bar 24 may be suspended from the cutter frame 11 on the usual hydraulic jacks (not shown) adjusting the trimmer bar to correspond to the cutting diameters of the boring heads 13 in a manner well known to those skilled in the art so not herein shown or described further.

The upper trimmer bar 23 is mounted on spaced hydraulic jacks 27, each of which includes a cylinder 29 mounted on the forward end of the cutter frame 11 inwardly of the hubs 12. Each hydraulic jack 27 has a piston rod 30 extensible from the cylinder 29 and mounted in a boss 31 depending from said trimmer bar for supporting said trimmer bar and vertically adjusting said trimmer bar to cut along the roof of a mine.

As shown in FIGURE 2, the trimmer bar 23 has a channel guide 32 extending therealong forming a guide for the cutter chain 25. The channel guide 32 extends along a guide member 33 supported on and extending forwardly of a support 35, from which the bosses 31 depend. The support 35 has a lower wedging face 36 inclined downwardly from the guide member 33. The wedging face 36 is customarily provided to engage the bottom wall of the kerf cut by the cutter chain 25 and wedge the cusp left between the boring heads 13 as the machine is advanced to feed the boring heads 13 into the mine face. In the present invention, however, the wedging face moves downwardly into engagement with the advance edge of the cusp and breaks the cusp down prior to advance of the machine a distance sufficient to wedge the cusp down.

The lower trimmer bar 24 has a guide 37 for the cutter chain 25, similar to the guide 32 and guiding the lower run of said cutter chain to make a trimming cut along the mine floor.

The cutter chain 25 is trained about corner sprockets 26, at opposite ends of the lower trimmer bar 24 and extends angularly inwardly and upwardly therefrom, one run of said cutter chain being trained about coaxial drive sprockets 39, suitably secured to a drive shaft 40, journalled in a hub 41, extending outwardly from the front face of the gear casing or cutter frame 11, and driven from suitable drive gearing (not shown), enclosed within the gear casing or cutter frame 11. The opposite run of the cutter chain 25 is trained about an idler sprocket 43, mounted on the cutter frame 11 on a shaft 44, extending from the front face of the cutter frame 11.

The two outer runs of the cutter chain 25 are trained outwardly and upwardly about corner sprockets 45, mounted on brackets 46, extending laterally outwardly and downwardly from the cutter bar 23 and positioning the sprockets 45 to guide the cutter chain 25 for movement along the guide 32 extending along the cutter bar 23, to cut out the cusps depending from the mine roof between the boring heads 13.

A suitable tensioning idler 46 on the tensioning arm 47 is provided to maintain tension on the cutter chain 25 as in an application Serial No. 849,340, filed by Walter Silks on October 29, 1959, now Patent No. 2,982,529, so not herein shown or described further.

In FIGURE 4 of the drawings, I have shown an illustrative form of fluid circuit for supplying fluid under pressure for raising and lowering the upper trimmer bar 23 and have shown a pumping or pulsing means connected in this fluid circuit for reciprocably moving the upper trimmer bar during the operation of cutting, when the trimmer bar is in a selected cutting position. The source of supply of fluid under pressure is shown as comprising a fluid storage tank 49, a pump 50 connected with said tank through an intake line 51, a pressure line 53 connected from the pump 50 to supply fluid under pressure to two control valves 54 and 55. The valve 54 is provided to elevate and lower the upper trimmer bar 23, while the valve 55 is provided to elevate and lower the lower trimmer bar 24. A return line 56 connects the valves 54 and 55 with the tank 49, while a by-pass line 57 having a by-pass valve 59 therein, is connected across the pressure line 53 and the return line 56 to by-pass fluid under pressure back to tank when the valves 54 and 55 are in their closed positions and the trimmer bars 23 and 24 are in their proper positions of adjustment with respect to the mine roof and mine floor respectively.

The valve 54 has a pressure line 60 leading therefrom and having connection with the head end of the cylinder 29 to supply fluid under pressure to said cylinder to elevate the trimmer bar 23 and hold said trimmer bar in position. The pressure line 60 leads across the machine to the head end of the opposite cylinder 29 to simultaneously raise and lower both ends of the trimmer bar 23. A pressure line 61 leads from the valve 54 to the piston rod ends of the two cylinders 29 to effect lowering movement of the trimmer bar 23 and to supply pressure, balancing the pressure on the head ends of the cylinders 29 to retain the trimmer bar 23 in a fixed position of adjustment.

A relief valve 63 is connected with the pressure line 60 through a line 64 and returns fluid to tank 49 upon overload conditions in the pressure line 60. In like manner, a relief valve 65 is connected in the pressure line 61 to return fluid to tank 49 upon overload conditions.

A pulsing pump 67 is mounted on the front of the cutter frame 11 on spaced supports 69 projecting forwardly therefrom. As shown in FIGURE 4, the pulsing pump includes spaced cylinders 70 and 71 having pistons 72 and 73 therein, respectively. The piston rod end of the cylinder 70 is connected with the pressure line 61 through a pulsing line 74. The head end of the cylinder 70 is connected with the pressure line 60 through a pulsing line 75.

The piston 72 has a piston rod 76 extending therefrom through a head or end cover 77 for the pump, and pivotally connected at its outer end to an oscillating lever 79 on a pivot pin 80. The oscillating lever 79 is pivotally mounted on the cutter frame 11 on a pivot pin 81, spaced downwardly from the pivot pin 80. The oscillating lever 79 has a bifurcated upper end portion 83 engaging opposite sides of an eccentric 84 mounted on the drive shaft 40 for driving the coaxial connected sprockets 39. Thus, the piston 72 will be reciprocably driven in the cylinder 70 whenever the cutter chain 25 is driven about the upper and lower trimmer bars 23 and 24 respectively.

The oscillating lever 79 has a depending arm 85 pivotally connected to a piston rod 86 extending from the piston 73, to set up a pulsing current in pressure lines 88 and 89 leading from the control valve 55 for adjusting the elevation of the lower trimmer bar 24.

It should here be understood that while I have shown a cylinder 71 and piston 73 for vertically reciprocating the lower trimmer bar 24 in the same manner as the upper trimmer bar 23, that the lower trimmer bar need not be reciprocated except under certain abnormal cutting conditions. The cylinder 71, therefore, will not always be used, but is included in the block containing the cylinder 70 to be connected to the pressure lines for adjusting the lower trimmer bar vertically where necessary.

The pressure line 61 is shown as having a fluid replenishing line 90 connected thereto and leading from the tank 49. The fluid replenishing line 90 has a check valve 91 therein, to prevent the back flow of fluid to the tank 49, and is provided to replenish fluid in the pressure line 61 when the valve 54 is in a closed position, to connect the pressure lines 60 and 61 in a closed circuit. Fluid is drawn into the pressure line 61 where necessary on the suction strokes of the pump 67 to make up fluid to balance the fluid in the pressure line 60. It should here be understood that when the valve 54 is in position to hold the trimmer bar 23 in a fixed position of elevation, that the two pressure lines 60 and 61 are blocked from the pressure and return lines 53 and 56 respectively to hold fluid in the head and piston rod ends of the cylinders 29. A closed circuit is thus provided between the pressure lines 60 and 61, and the head and piston rod ends of the cylinders 29, respectively. Thus, as the piston 72 reciprocably moves within the cylinder 70 toward the head end thereof, fluid will be displaced from the head end of the cylinder 70 into the head ends of the cylinders 29, and will be displaced from the piston rod ends of the cylinders 29 into the piston rod end of the cylinder 70, and vice versa upon a reversal in the stroke of the piston 72. The piston 72, reciprocably driven along the cylinder 70, will thus set up pulsing currents in the pressure lines 60 and 61 for alternately raising and lowering the cutter bar 23 in accordance with the fluid displaced, and therefore vertically reciprocating said cutter bar as long as the cutter chain 25 is in operation.

During operation of the machine, as the upper trimmer bar 23 is reciprocably driven and the machine is advanced into the face to feed the boring heads 13 thereinto, the inclined wedging surface 36 will intermittently move downwardly to engage an advance end 93 of the cusp, and break off the cusp upon the downward stroke of the trimmer bar 23, as indicated by dotted lines in FIGURE 2.

The trimmer bar 23 will thus break-off the cusps with a more or less hammer-like action due to reciprocable movement thereof during the cutting operation. This will effect the breaking off of the cusps prior to advance of the trimmer bar 23 to an extent sufficient to break-off the cusps with a wedging action, resulting in a marked reduction of power required to feed the machine and wedge the cusps down, and a more uniform breaking action of the cusps during the mining operation.

While I have herein shown and described one form in which my invention may be embodied, it may readily be understood that various modifications and variations in the invention may be attained without departing from the spirit and scope of a novel concepts thereof, as defined by the claims appended hereto.

I claim as my invention:

1. In a mining machine of the boring type having a plurality of boring heads for cutting contiguous bores in a mine face in advance of the machine, a frame, upper and lower horizontally extending trimmer bars mounted on said frame immediately to the rear of said boring heads for vertical adjustment with respect thereto, an endless cutter chain trained along said trimmer bars, a drive sprocket and an idler sprocket rotatably mounted on said frame in inwardly spaced relation with respect to opposite ends of said trimmer bar and between the latter and meshing with said cutter chain, a motor for driving said drive sprocket and driving said cutter chain along said cutter bar, and means continuously driven during the operation of driving said cutter chains about said trimmer bars for vertically reciprocably moving at least the upper of said trimmer bars during operation of said cutter chain, to engage said trimmer bar with the advance face of the cusp left between said bores, to effect a breaking operation thereof.

2. A mining machine in accordance with claim 1 in which hydraulic cylinders having piston rods extensible therefrom are provided to support and vertically adjust the upper of said trimmer bars, in which the means continuously driven during the operation of driving said cutter chain about said trimmer bars includes a pulsing pump and fluid connections from said pulsing pump to the head and piston rod ends of said cylinders for vertically reciprocating said upper trimmer bar to engage and break down the advance end of the cusp with a hammering action.

3. A mining machine in accordance with claim 2 wherein the upper trimmer bar has a lower wedging face inclined downwardly with respect to said cutter bar for exerting a wedging hammer-like action on the advance edge of the cusp, by reciprocable movement of said trimmer bar.

4. In a mining machine of the boring type having a plurality of boring heads for forming contiguous bores in a mine face in advance of the machine, a frame, upper and lower horizontally extending trimmer bars mounted on said frame immediately to the rear of said boring heads, an endless cutter chain trained about said trimmer bars, a drive sprocket and an idler sprocket rotatably mounted on said frame in inwardly spaced relation with respect to opposite ends of said trimmer bars and between the latter, for driving said cutter chain about said trimmer bars, a pair of laterally spaced cylinders having piston rods extensible therefrom, supporting the upper of said trimmer bars and vertically adjusting said trimmer bar in accordance with the diameter of the bores formed by said boring heads, a source of supply of fluid under pressure, a valve connected with said source of supply of fluid under pressure, pressure lines leading from said valve to the head and piston rod ends of said cylinders, said valve being effective to block said pressure lines when in an off position, to hold said trimmer bar in a selected position of adjustment, a pulsing pump including a cylinder having a piston therein and pressure lines leading from opposite ends of said cylinder to said pressure lines for alternately supplying fluid under pressure to the head and piston rod ends of said first-mentioned cylinders, and means reciprocably driven from the means for driving said drive sprocket, to reciprocably drive said piston and alternately set up pulsing currents in the head and piston rod ends of said first mentioned cylinders, to vertically reciprocate said upper trimmer bar.

5. A continuous mining machine in accordance with claim 4 in which the upper trimmer bar has a downwardly inclined and rearwardly extending wedging face inclined downwardly from the lower plane of cutting of the cutter chain for engaging the advance end of a cusp between the contiguous bores during advance of the machine, and breaking down the cusp with a hammer-like wedging action prior to advance of the machine a distance sufficient to wedge the cusp down.

6. In a continuous mining machine, a frame, a plurality of boring heads mounted on said frame for cutting contiguous bores in a mine face, a generally horizontal trimmer bar extending transversely of said frame in rearwardly spaced relation with respect to said boring heads and having a cutter chain guided for movement therealong, laterally spaced fluid pressure operated jacks disposed rearwardly of said boring heads and having head and piston rod ends, mounting said trimmer bar on said frame and vertically adjusting said trimmer bar with respect to said frame, and a continuously driven pumping means connected with said jacks for alternately sending pulsing currents to the head and piston rod ends of said jacks, to effect vertical reciprocable movement of said trimmer bar.

7. In a continuous mining machine, a frame, a plurality of boring heads mounted on said frame for cutting contiguous bores in a mine face, a generally horizontal trimmer bar extending transversely of said frame in rearwardly spaced relation with respect to said boring heads and having a cutter chain guided for movement therealong for cutting out a depending cusp left between said boring heads, means for driving said cutter chain along said trimmer bar, laterally spaced fluid pressure operated jacks including cylinders having piston rods extensible therefrom for supporting said trimmer bar on said frame and for vertically adjusting said trimmer bar with respect to said frame, individual pressure lines connected to the head and piston rod ends of said cylinders, a pulsing pump having connection with said pressure line for alternately setting up pulsing currents in said pressure lines, and means for continuously driving said pulsing pump during the operation of driving said cutter chain along said trimmer bar.

References Cited in the file of this patent
UNITED STATES PATENTS
2,823,024   Hagenbook _____ Feb. 11, 1958

UNITED STATES PATENT OFFICE
CERTIFICATE OF CORRECTION

Patent No. 3,014,706                          December 26, 1961

John S. Newton

It is hereby certified that error appears in the above numbered patent requiring correction and that the said Letters Patent should read as corrected below.

Column 1, line 30, for "room" read -- roof --; column 4, line 57, for "bar" read -- bars --; line 60, for "cutter bar" read -- trimmer bars --.

Signed and sealed this 24th day of April 1962.

(SEAL)
Attest:

ESTON G. JOHNSON
Attesting Officer

DAVID L. LADD
Commissioner of Patents